July 18, 1950
M. J. ZALESKE
2,515,484
HOSE CLAMP
Filed Dec. 15, 1945
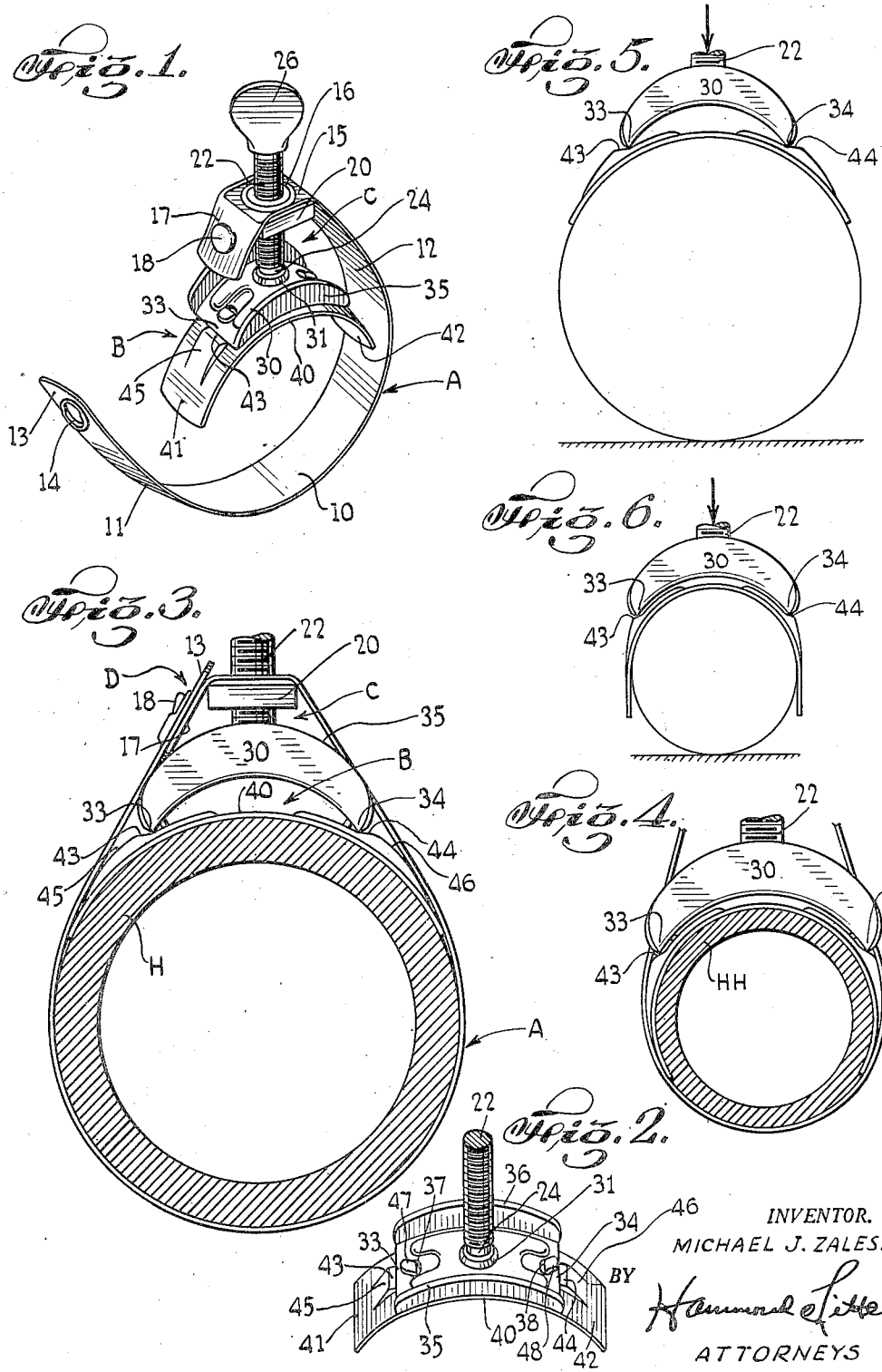
INVENTOR.
MICHAEL J. ZALESKE
BY
Hammond Littell
ATTORNEYS Patented July 18, 1950

2,515,484

UNITED STATES PATENT OFFICE 2,515,484

HOSE CLAMP

Michael J. Zaleske, Union, N. J., assignor to Ideal Clamp Manufacturing Co., Inc., New York, N. Y., a corporation of New York Application December 15, 1945, Serial No. 635,154

4 Claims. (Cl. 24—19)

This invention relates to hose clamps and particularly to improvements of the type hose clamps disclosed in my copending application, Serial No. 545,423, filed July 18, 1944, now United States Patent No. 2,392,210, issued January 1, 1946.

In that application I have disclosed hose clamps wherein a flexible clamping band formed as a loop works with an opposing arcuate flexible saddle element of changeable curvature so as to clamp any of a variety of sizes of hose, in substantial conformity to its curvature, upon the manipulation of tightening means which include a rigid pusher to bear against the saddle and a screw working between the pusher and a junction for the extended sides of the band loop. The flexible saddle element has abutments extended from the convex face thereof on opposite sides of its mid-portion, and the pusher is an arched member having spaced ends which provide rigid feet to work against these abutments. As the screw is turned the flexible saddle element and the looped element are forced relatively in opposite directions so as to telescope, flex and clamp them tightly against a hose disposed therebetween.

The object of my present invention is to enhance the effectiveness of hose clamps of that type, and especially to obviate a tendency heretofore observed in some forms thereof for the flexible saddle element to become bulged between its ends and the points of engagement of its abutments by the pusher member when the clamp is applied and tightened on a hose under a strong screwing torque or to a relatively small diameter. A further object of this invention is to provide a new and improved form of the flexible saddle element whereby that element and its cooperating pusher will serve more effectively in a hose clamp that is suitable for securely clamping hose of a considerable range of sizes.

The foregoing and other objects, features and advantages hereof will become apparent from the following detailed description of an illustrative embodiment, while the new features of construction and operation which I claim as my invention will be set forth more particularly in the appended claims. The detailed description refers to the accompanying drawings which form a part hereof and in which:

Fig. 1 is a perspective view of the illustrative embodiment;

Fig. 2 is a perspective view of the flexible saddle and pusher assembly;

Fig. 3 is a side elevation of the clamp in working position on a hose of relatively large diameter, the hose being shown in section and the upper part of the tightening screw being broken away;

Fig. 4 is a similar side elevation of the clamping elements in working position on a hose of relatively small diameter;

Fig. 5 and Fig. 6 are diagrams respectively illustrating the relative positions assumed by the flexible saddle and the pusher when thrust similarly against circular members of relatively large and relatively small diameter, respectively.

As appears from the drawings, a flexible metal band A having a looped portion 10 cooperates with an arcuate flexible metal strap or saddle B of substantially semi-circular form to define an approximately circular clamping structure of variable radius which can be constricted upon a hose such as H or HH, so as to converge, flex and clamp the loop and the saddle tightly together against the hose in substantial conformity to its curvature, by the manipulation of operating means indicated generally at C. The operating means include a rigid pusher 30 of arched form having spaced feet to engage and thrust the saddle B on opposite sides of its midportion 40, together with a screw 22 to bear at its lower end 24 against a centrally disposed seat 31 on the pusher 30. This screw is threaded through a nut 20 secured to the band A adjacent a junction D for the end portions of the extended sides or legs 11 and 12 of band A. A thumbpiece 26 is provided on the upper end of screw 22 for turning it to tighten or release the clamping elements on a hose.

The junction D preferably comprises a quickly separable snap connection between the end portions 13 and 17, respectively, of the band legs 11 and 12. For example, end portion 13 is formed with an eye 14 reinforced around its margin, and end portion 17 is formed with a cooperating button 18 over which the eye 14 may be snapped by the thumb to complete the junction or connection between the band legs. When the connection is disengaged the leg 11 may be pulled downward or open with respect to leg 12 so as to move the clamp laterally over a hose in position until the hose is disposed between saddle B and loop 10, after which leg 11 may be flexed toward junction D to engage the elements 18 and 14. Then the clamp may be operated to clamp the hose, as hereinafter more fully described.

The nut 20 may be secured to band portion 15 near the end of leg 12, such as by interclinched circular flanges at 16 or by welding or other means of permanent attachment.

The pusher 30 is a rigid arched member disposed between the band legs 11 and 12 and having spaced ends or feet 33 and 34, respectively, to engage and thrust the opposite sides of the flexible saddle. It preferably is formed with side flanges 35 and 36 defining a channel structure which will embrace parts of the band legs 11 and 12 in some conditions of operation of the clamp, as indicated in Fig. 3 and Fig. 4. The pusher also is preferably held in working relation to the flexible saddle by means of struck-up tongues 37 and 48 on the latter which extend through openings 37 and 38, respectively, in the pusher and are bent over to hold the two parts together.

Referring more particularly to Figs. 2, 3 and 4, it will be seen that the flexible saddle B has integral protuberances from its convex face on opposite sides of its midportion 40, between that portion and its ends 41 and 42. These protuberances are alike in form, though oppositely disposed, and they provide in two ways for the improved functioning of the hose clamp, as follows:

In position to be engaged and thrust by the respective ends or feet 33 and 34 of the pusher are cam surfaces 43 and 44, respectively, which project outwardly from the opposite sides of the saddle so that the feet will thrust the cam surfaces at inward points thereof when the saddle has a relatively large radius of curvature, as it does when positioned on a hose of relatively large diameter such as hose H in Fig. 3, and so that the cam surfaces may move or slide inwardly relative to the feet, to be thrust thereby at points nearer to the respective saddle ends 41 and 42, as the saddle is flexed upon a hose to a relatively small radius of curvature.

In other words, as appears from Fig. 4, when the saddle is thrust against a hose by the pusher feet to a smaller radius of curvature, such as it has when clamped on a hose HH of relatively small diameter, the points of engagement of the feet 33 and 34 with the respective cam surfaces 43 and 44 appear to progress outwardly on these cam surfaces, while in fact the cam surfaces progress inwardly relative to the respective feet as the change of curvature of the saddle causes a larger portion of its length to be subtended beneath the arch of the pusher between its spaced pushing feet. When the saddle element has substantially its maximum operative radius of curvature, such as when it is placed upon a hose of approximately the largest size for which the clamp is adapted, the cam surfaces 43 and 44 extend approximately normal to the direction of thrust of the pushing feet, as appears from Fig. 3 and from the diagram in Fig. 5 of the drawings. On the other hand, when the saddle is thrust by the feet to approximately its minimum operative radius of curvature, such as when it is clamped against a hose of approximately the smallest diameter for which the clamp is adapted, the cam surfaces have converged inwardly with respect to the pushing feet and have assumed a direction of slope oblique to the direction of thrust of the pusher feet.

The effect of this construction is illustrated diagrammatically in Fig. 5 and Fig. 6. Fig. 5 shows the saddle being thrust by the pusher, through a force applied vertically downward to the pusher, into tight contact with a circular member or hose of relatively large diameter. It will be noticed in this case that the pushing feet 33 and 34 are disposed near the inner extremities of the cooperating cam surfaces 43 and 44. Fig. 6, on the other hand, shows the saddle being thrust similarly by the pusher into tight contact with a circular member or hose of relatively small diameter, and in this case it is seen that the points of engagement of the feet 33 and 34 against the cam surfaces have progressed nearer to the outer extremities of these surfaces and the ends of the saddle. By this progression under conditions of changing curvature of the saddle element the tendency of the pusher thrust to force the sides of the saddle toward the axis of the hose is increased as the radius of curvature of the saddle is decreased, and in this way side portions of the saddle beyond the thrust points are held in tight engagement with the hose, without bulging, as the clamp is constricted on a hose under a strong screw torque or to a relatively small diameter.

As appears further from Fig. 4 and Fig. 6, the opposite sides of the saddle element preferably are provided also with longitudinal curved surfaces 45 and 46, respectively, which as illustrated extend from the outer extremities of the respective cam surfaces 43 and 44 toward the saddle ends 41 and 42. These protruding curved surfaces are formed to bear and fit against the respective legs 11 and 12 of the band A, as appears in Fig. 4, when the clamp is so tightened upon a hose that the circular structure defined by saddle B and loop 10 has a relatively small diameter. Thus they provide further assurance against outward bulging of the saddle portions between the ends 41 and 42 and the thrust points of the pusher feet, and the flexible clamping elements are held securely in an approximately circular form under conditions which otherwise might produce an objectionable bulging notwithstanding the preventative effect of the cam surfaces 43 and 44.

The protuberances which provide the cam surfaces 43 and 44 and the longitudinally extended curved surfaces 45 and 46 as aforementioned can be made in various ways, but they preferably are made by simply pressing metal from the opposite side portions of the saddle element to the desired form.

In the use of the improved hose clamp, the screw 22 is turned to retract the pusher and saddle assembly toward junction D and the clamp is then engaged over a hose as above described, or by slipping the clamp over an end of the hose if this be required by having the ends of the band legs connected permanently rather than separably as at junction D. Then the screw is turned by thumbpiece 26 to thrust the pusher and the saddle toward loop 10 and simultaneously pull the loop oppositely toward the saddle, until the circular structure defined by the saddle and loop has become tightly constricted upon the hose. The thrust of the pushing feet against the cam surfaces of the saddle causes the saddle to flex as above described and conform substantially to the curvature of the hose while clamping it, and at the same time the loop 10 is flexed and clamped similarly against the remaining circumference of the hose until the flexible clamping elements have converged or telescoped to a condition of secure clamping action. This desired effect is assured whether the hose being clamped is relatively large or relatively small in diameter, if its size be within the range of sizes for which the particular clamp is adapted.

It will be apparent that the new features herein set forth are not restricted to the details of the illustrated embodiment but may be embodied in other forms of construction within the scope of the appended claims.

I claim:

1. A hose clamp comprising a flexible band formed as a loop having legs to extend to a junction, an arcuate flexible saddle of changeable curvature disposed between said legs to define with said loop an approximately circular structure of variable radius, and means including a rigid pusher having spaced feet to bear against said saddle on opposite sides of its midportion and a screw working between said junction and said pusher for forcing said saddle and said loop simultaneously in opposite directions so as to converge, flex and clamp the same tightly against a hose within said structure, wherein said saddle has cam surfaces to be engaged by said feet projecting outwardly from said opposite sides to slide inwardly relative to said feet as said saddle is flexed upon a hose by the thrust of said feet from a relatively large to a smaller radius of curvature, such that the points of thrust of said feet against said saddle progress toward the ends of said saddle as said structure is constricted upon a hose therewithin.

2. A hose clamp comprising a flexible band formed as a loop having legs to extend to a junction, an arcuate flexible saddle of changeable curvature disposed between said legs to define with said loop an approximately circular structure of variable radius, and means including a rigid pusher having spaced feet to bear against said saddle on opposite sides of its midportion and a screw working between said junction and said pusher for forcing said saddle and said loop simultaneously in opposite directions so as to converge, flex and clamp the same tightly against a hose within said structure, wherein said saddle has cam surfaces to be engaged by said feet projecting outwardly from said opposite sides to slide inwardly relative to said feet as said saddle is flexed upon a hose by the thrust of said feet from a relatively large to a smaller radius of curvature, such that the points of thrust of said feet against said saddle progress toward the ends of said saddle as said structure is constricted upon a hose therewithin, said saddle also having longitudinally extended protruding curved surfaces between its ends and the respective cam surfaces to bear against said legs and prevent bulging of the saddle portions therebetween.

3. A hose clamp comprising a flexible band formed as a loop having legs to extend to a junction, an arcuate flexible saddle of changeable curvature disposed between said legs to define with said loop an approximately circular structure of variable radius, a threaded screw socket on said band adjacent said junction, said saddle having abutments projecting from its convex face on opposite sides of its midportion, a rigid pusher between said legs spanning said midportion and having spaced feet to engage and thrust the respective abutments, and a tightening screw threaded in said socket and engaging said pusher to thrust the pusher and thereby converge said saddle and said loop tightly around a hose disposed therebetween, wherein said abutments have cam surfaces respectively engaged by said feet and extending oppositely away from said feet in a direction approximately normal to the direction of thrust of said feet when said saddle has substantially its maximum radius of curvature, said surfaces converging inwardly with respect to said feet and assuming a slope oblique to said direction of thrust as said saddle is thrust by said feet to approach its minimum operative radius of curvature.

4. In a hose clamp, an arcuate flexible metal strap element of changeable curvature having abutments projecting from its convex face on opposite sides of its midportion, a rigid arched pusher held adjacent said convex face to span said midportion and having spaced feet to engage and thrust the respective abutments, and means so holding said pusher in relation to said element, wherein said abutments have cam surfaces respectively engaged by said feet and extending oppositely away from said feet in a direction approximately normal to the direction of thrust of said feet when said strap element has substantially its maximum operative radius of curvature, said surfaces converging inwardly with respect to said feet and assuming a slope oblique to said direction of thrust as said strap element is thrust by said feet to approach its minimum operative radius of curvature.

MICHAEL J. ZALESKE.

REFERENCES CITED

The following references are of record in the file of this patent:

UNITED STATES PATENTS

| Number | Name | Date |
| --- | --- | --- |
| 1,532,596 | Madsen | Apr. 7, 1925 |
| 2,392,210 | Zaleske | Jan. 1, 1946 |